Feb. 14, 1939.   C. S. KNIGHT   2,146,749
FILTER MEDIUM AND METHOD OF FORMING THE SAME
Filed Aug. 6, 1935   2 Sheets-Sheet 1
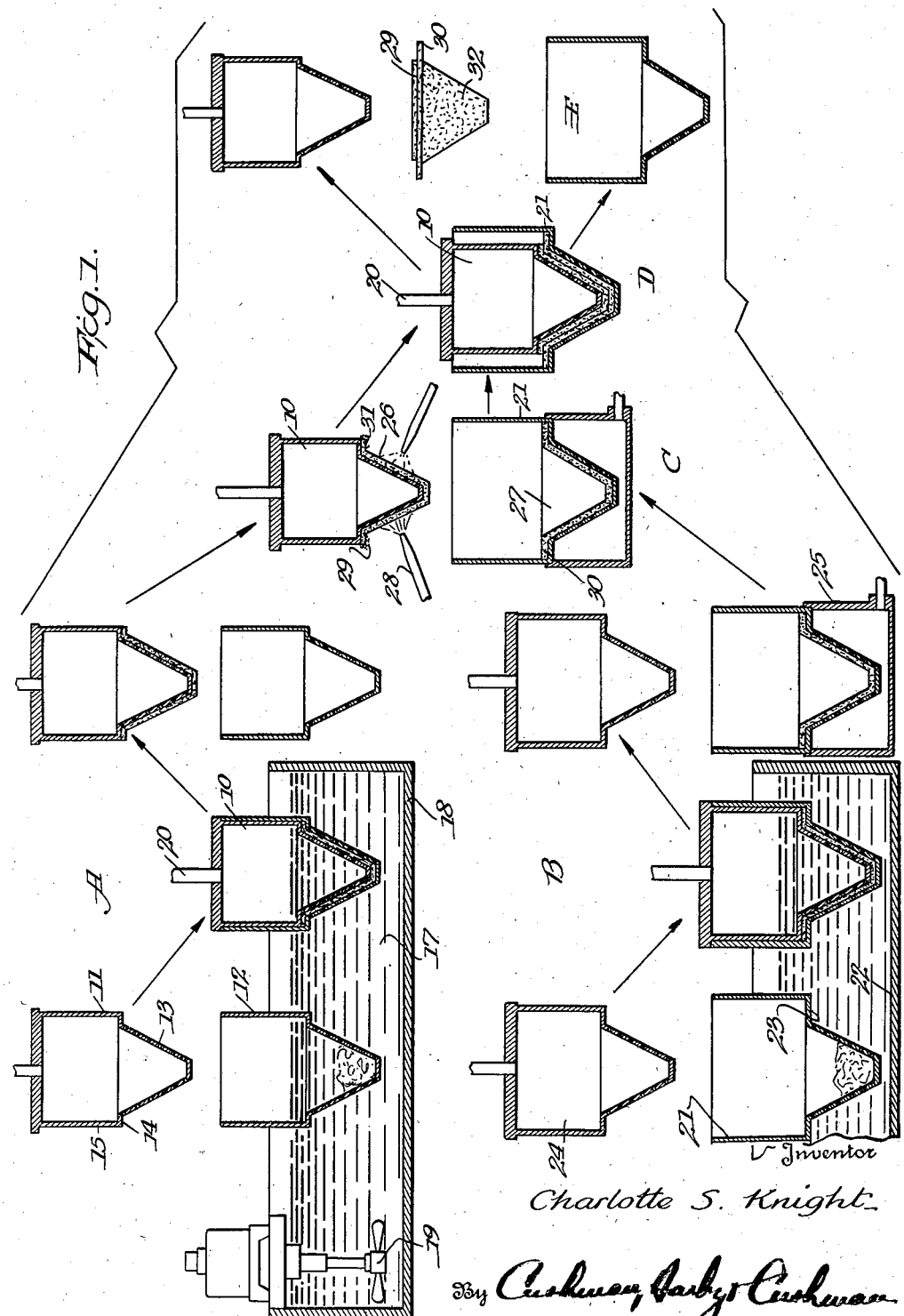

Feb. 14, 1939. C. S. KNIGHT 2,146,749
FILTER MEDIUM AND METHOD OF FORMING THE SAME
Filed Aug. 6, 1935 2 Sheets-Sheet 2
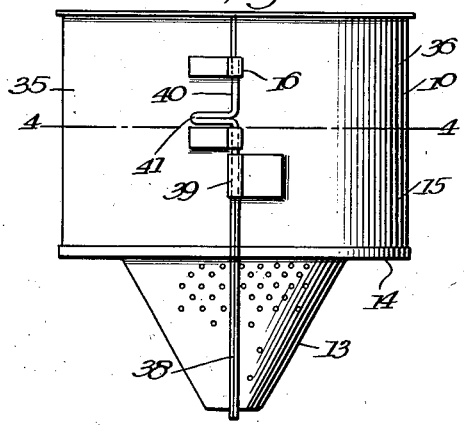
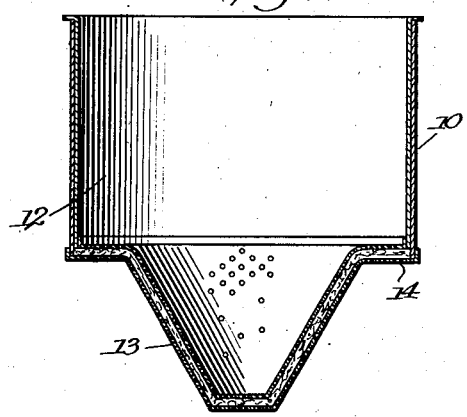
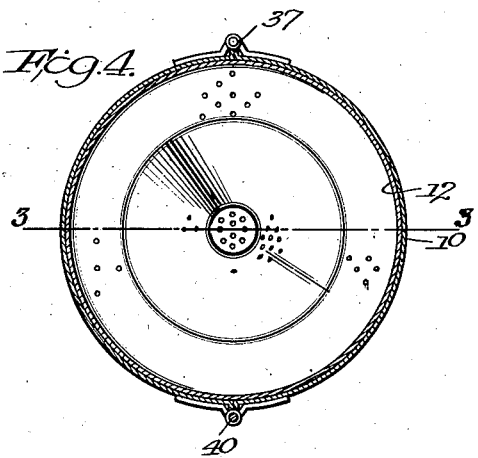
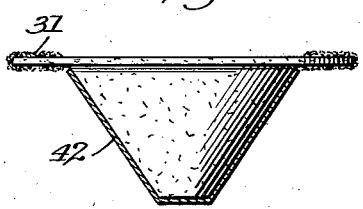
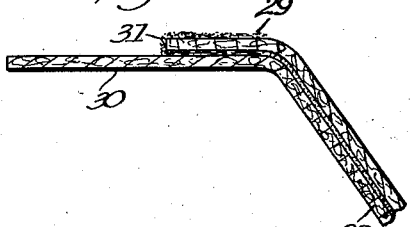
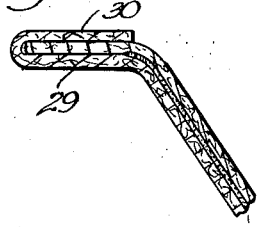
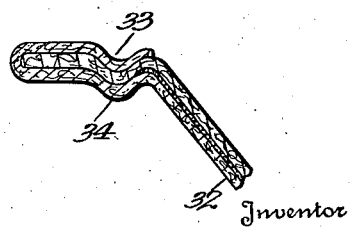
Inventor
Charlotte S. Knight.
By Cushman, Darby & Cushman
Attorneys Patented Feb. 14, 1939

2,146,749

UNITED STATES PATENT OFFICE 2,146,749

FILTER MEDIUM AND METHOD OF FORMING THE SAME

Charlotte S. Knight, Merrick, N. Y., assignor of three-fourths to Ira A. Campbell Application August 6, 1935, Serial No. 35,013

16 Claims. (Cl. 210—204)

This invention relates to filters and to the method and apparatus for making the same.

An object of the invention is to provide an improved filter composed of two or more layers which are joined at their marginal edges in such a manner as to prevent separation of the layers.

A further object contemplates a method of forming the filter layers, including an even distribution of the fibers, which are utilized to make the layers, whereby a greatly improved product is formed.

This improved method further provides for the coating of one or more layers with carbon, and then folding and joining the edges of the layers to form an interlocking joint which not only prevents the escape of carbon, but the intrusion of bacteria between the layers.

With the foregoing and other objects in view, the invention will now be more particularly described, reference being had to the accompanying drawings, wherein:

Figure 1 is a flow sheet showing the detailed steps of forming the filter layers and joining the layers together.

Figure 2 is a detail view in side elevation of one of the molds.

Figure 3 is a longitudinal section on line 3—3 of Figure 4.

Figure 4 is a transverse section on line 4—4 of Figure 2.

Figures 5, 6 and 7 are detailed views showing the several steps in joining the filter layers, and Figure 8 is a view showing the inner layer with loose fibers applied to the marginal edges thereof.

Referring to Figure 1 of the drawings, I have illustrated the steps of making the individual layers or films which are subsequently joined together to form the finished filter medium. In carrying out these steps, I provide a mold 10 comprising inner and outer mold sections 11 and 12, respectively. Each section is provided with a cup-shaped perforated portion 13 of screen-like formation having at its upper edge a flat marginal flange 14 which merges into a tubular imperforate portion 15. Each of these imperforate portions are so proportioned as to produce a machine-like fit when the sections are brought together for a purpose to be hereinafter described. The outer section 12 is preferably split longitudinally thereof to form a two-part hinged section having latching means 16 for securing the parts together.

The first step in the method of forming a filter layer comprises introducing a quantity of asbestos fibers into water or other liquid and maintaining them in uniform suspension. The lower mold section 12 is then introduced into a bath 17 of agitated fluid, preferably water, contained in a tank 18 shown at A, Figure 1. Any suitable form of stirrer 19 may be utilized to agitate the water. Thereafter, a predetermined amount of the mixture, comprising the fibers in suspension, are poured into the mold section which is submerged sufficiently to cover the perforated portion thereof. The inner mold section, initially positioned above the tank, is then moved downwardly until it enters the outer mold section, the continued downward movement squeezing the greater portion of the liquid from the fibers. At the same time, the fibers are compressed and shaped into the form which the layer is ultimately to assume. By reason of the imperforate portions 15 of the two sections having a close machine-like fit, the fibers are prevented from passing upwardly past the perforated portions of the mold sections and are therefore retained and compressed between these perforated portions.

The mold is then removed from the bath and suction applied to the interior of the inner section through the suction pipe 20 connected to the upper end thereof. This facilitates separating the mold sections and assures the layer of being removed intact and securely retained to the top mold section where it is held until the next succeeding operation is completed.

The next operation comprises the steps of forming another layer slightly larger in size than the first layer.

Substantially the same procedure is followed in forming the second layer, as shown at B in Figure 1. The lower mold section 21 having been placed in the tank of agitated water 22, a predetermined quantity of the mixture is introduced into this lower mold section which, it will be noted, is slightly larger in size than the first mentioned mold section. It will further be noted that the flange 23 is substantially twice the width of the flange 14 of the first mold section. The inner mold section 24 is then lowered into the outer mold section, squeezing most of the fluid from the mixture and at the same time shaping the layer to its final form. The mold is then removed from the bath and suction applied to the outside of the lower mold section by suitable suction means 25. Thereupon, the inner mold section is elevated with the layer retained intact in the lower mold section.

The next step is that of treating one or another of the newly formed layers prior to bringing the two layers together and joining the same. Referring to section C of the drawings, the inner section 10 of the small mold is shown suspended above the section 21 of the larger mold. The mold 10, as stated aforesaid, carries the first formed and smaller layer 26, while the section 21 has retained therein the second formed and larger layer 27. In this position, I coat either one or both layers with a coating of carbon.

In the drawings, there are illustrated a plurality of sprays 28 for the purpose of spraying a coating of the carbon to the outer face of the smaller layer 26. It is obvious that this coating could be applied by hand by means of a brush or other implement.

Subsequent to spraying the carbon coating on the layer 26, I take a number of loose asbestos fibers and apply them to either the flange 29 of the layer 26 or the flange 30 of the layer 27. In the drawings, these loose fibers are shown as being applied to the flange 29 and are denoted by the reference character 31.

The two mold sections 10 and 21 are then moved into contacting relation as shown at D in Figure 1, whereby the layers 26 and 27 are moved into nesting engagement. Suction is then applied to the section 10 through the suction pipe 20 for a short period of time in order to insure a close engagement between the layers at all points. With the suction still applied, the lower mold section 21 is removed from the upper section 10 after which the suction is broken. The partly formed filter medium 32 is then removed from the mold section 21 as shown at E in Figure 1.

The next step consists in closing the marginal portions of the layers in such a manner that the fibers of one layer interlock with those of the other layer to provide a complete seal which will prevent separation of one layer from the other, and thereby retain the coating of carbon between the layers and also preclude the possibility of bacteria entering between the layers. This is accomplished as shown in Figures 5 to 7 by first folding over the wider flange 30 of the outer and larger layer 27 by any suitable means (not shown). The folded flange portions are then placed between any suitable clamping means (not shown), which is designed to press the flanges together and, at the same time, form a groove 33 in the upper surface of the composite structure and a rib 34 projecting from the undersurface thereof. This last operation is for the purpose of forming the filter medium so that it may be readily clamped between the sections of the filter casing shown and described in my copending application for Filter faucets, Serial No. 725,357, filed May 12, 1934.

Referring to Figures 2 to 4, there are disclosed detailed views of the layer forming mold 10. It is obvious that the perforated portion 13 of each section may be of any desired form, such as conical cup-shape as illustrated, dome-shaped, or any other configuration that may be found desirable.

The outer section 12, as stated aforesaid, is split longitudinally thereof to form identical parts 35 and 36 connected by a piano hinge 37, and the adjoining edges of the parts are flattened to provide abutting contact faces 38. The latching means 16 may be of any desired form, and, in the present instance, comprises a tubular keeper 39 attached to one part and a sliding bolt 40 carried by the other part and having an operating handle 41 formed inwardly therewith.

While in the present instance I have shown only one of each of the molds for forming the different size layers, this is merely illustrative, and I contemplate utilizing a plurality of molds of each size for commercial production. For instance, a battery of each group may be positioned so that the outer mold sections 12 may pass through the bath of agitated liquid on an endless conveyor, with the inner sections suspended above, so as to drop into the outer sections at predetermined times to form the layers. Instead of passing on an endless conveyor the outer mold sections may be supported on a rotatable table retained in the tank of agitated fluid.

In applying the loose fibers to the flanges of the layers, it is desirable, in some instances, to utilize a shell 42, as shown in Figure 8 to prevent the fibers from contacting with any other portions of the layer, except the flange. As an alternative, I may eliminate the step of applying loose fibers to the layers and instead fray the flanges 29 and 30 of each layer to free some of the fibers so that they will interlock when the layers are compressed as shown at D in Figure 1. Furthermore, while I have found that asbestos fibers are very desirable, it is to be understood that I do not limit myself thereto as other fibers may be utilized in forming the flanges.

I claim:

1. The method of making a filter medium which includes forming separate layers of fibrous material, superimposing one layer upon the other, folding over the marginal portions of one layer upon those of the other layer, and subjecting the marginal portions of the layers to pressure to interlock the fibers of one layer to those of the other layer.

2. The method of making a filter medium which includes forming separate layers of fibrous material, coating all except the marginal portions of one layer with carbon, superimposing one layer upon the other, folding over the marginal portions of one layer upon those of the other layer, and subjecting the marginal portions of the layers to pressure to interlock the fibers of one layer to those of the other layer.

3. The method of making a filter medium which includes forming separate layers of fibrous material of different sizes, superimposing one layer upon the other, folding over the marginal portions of the larger layer upon those of the smaller layer, and subjecting the marginal portions of the layers to pressure to interlock the fibers of one layer to those of the other layer.

4. The method of making a filter medium which includes forming separate layers of fibrous material of different sizes, fluffing up the marginal portions of each layer to free the fibers, superimposing one layer upon the other, folding over the marginal portions of the larger layer upon those of the smaller layer, and subjecting the marginal portions of the layers to pressure to interlock the fibers of one layer to those of the other layer.

5. The method of making a filter medium which includes forming separate layers of fibrous material of different sizes, adding loose fibers to the marginal portions of one layer, superimposing one layer upon the other, folding over the marginal portions of the larger layer upon those of the smaller layer, and subjecting the marginal portion of the layers to pressure to interlock the loose fibers to each of the layers.

6. The method of making a filter medium which includes forming separate layers of asbestos fibers of substantially cup-shape formation, forming the marginal portions of one layer of greater width than those of the other layer, superposing one layer upon the other, folding the marginal portions of greater width over the other marginal portions, and subjecting the marginal portions of the layers to pressure to interlock the fibers of one layer to those of the other layer.

7. As a new article of manufacture, a filter medium comprising superposed layers of fibrous material, the marginal edges of one layer being folded over the marginal edges of the other layer and pressed thereto to interlock the fibers of one layer to those of the other layer.

8. As a new article of manufacture, a filter medium comprising superposed layers of fibrous material, the marginal portions of one layer being of greater width than those of the other layer and folded around the latter and pressed thereto to interlock the fibers of one layer to those of the other layer.

9. As a new article of manufacture, a filter medium comprising superposed layers of fibrous material, the marginal portions thereof having interposed therebetween additional loose fibers, the marginal portions of one layer being of greater width than those of the other layer, and folded around the latter and pressed thereto to form an interlocking joint between the loose fibers and the layers.

10. As a new article of manufacture, a filter medium comprising superposed layers of fibrous material, the marginal portions thereof having interposed therebetween additional loose fibers, the marginal portions of one layer being of greater width than those of the other layer, and folded around the latter and pressed thereto to form an interlocking joint between the loose fibers and the layers, the folded and pressed marginal portions having a groove formed in one side and a rib on the other side to facilitate clamping of the filter medium in a filter casing.

11. As a new article of manufacture, a filter medium comprising superposed layers of fibrous material of substantially cup-shape form having flat marginal portions, one of which is of greater width than the other and folded therearound and pressed thereto to interlock the fibers of one layer to those of the other.

12. The method of forming a layer of filter medium which comprises placing a quantity of fibers in suspension in a liquid, introducing the fiber-laden liquid into a perforated mold section, placing said mold section in a bath of liquid, maintaining the fibers in a substantially uniform state of suspension in the liquid, and forcing a complementary mold section into contact with the first section within the bath to condense the fibers and remove at least a part of the liquid therefrom.

13. The method of forming a layer of filter medium which comprises placing a quantity of fibers in suspension in a liquid, introducing the fiber-laden liquid into a perforated mold section, placing said mold section in a bath of liquid, agitating the bath of liquid to maintain the fibers in a substantially uniform state of suspension, and forcing a complementary mold section into contact with the first section within the bath to condense the fibers and remove at least a part of the liquid therefrom.

14. The method of forming a layer of filter medium which comprises placing a quantity of fibers in suspension in a liquid, introducing a fiber laden liquid into a mold section with the fibers in a substantially uniform state of suspension in the liquid, and forcing a complementary mold section into contact with the first section while the fibers are still in a substantially uniform state of suspension in the liquid, to condense the fibers and remove at least a part of the liquid therefrom.

15. The method of making a multi-layer filter medium which includes forming a layer of fibrous material by introducing a mixture of fibers and liquid into one section of a perforated mold, pressing the complementary mold section into contact with the first section to remove some of the liquid from the fibers, shaping a layer during the pressing operation, applying suction to one mold section, removing the other section while maintaining the suction on the first section, similarly forming a second layer, then pressing the mold sections carrying the separate layers together while still maintaining a suction on said sections, breaking the suction on one of said sections, removing said last mentioned section from its respective layer, and then breaking the suction on the other mold section to permit the removal of the multi-layer filter medium.

16. The method of making a multi-layer filter medium which includes forming a layer of fibrous material by introducing a mixture of fibers and liquid into one section of a perforated mold, pressing a complementary mold section into contact with the first section to remove some of the liquid from the fibers, shaping a layer during the pressing operation, applying suction to one mold section, removing the other section while maintaining the suction on the first section, similarly forming a second layer, applying a coating of carbon on one of the exposed layers, then pressing the mold sections carrying the separate layers together while still maintaining suction on said sections, breaking the suction on one of said sections, removing said last mentioned section from its respective layer, and then breaking the suction on the other mold section to permit removal of the multi-layer filter medium.

CHARLOTTE S. KNIGHT.